(12) United States Patent
DeCato et al.

(10) Patent No.: US 9,073,241 B2
(45) Date of Patent: *Jul. 7, 2015

(54) INJECTION MOLDING PROCESS AND COMPOSITIONS WITH IMPROVED SEALING CHARACTERISTICS FOR MOLD-IN-PLACE GASKETS

(75) Inventors: Alfred A. DeCato, Waterbury, CT (US); James E. Lionberger, East Hampton, CT (US); Anthony Horelik, Farmington, CT (US); Debora E. Duch, Glastonbury, CT (US); Gregory A. Krueger, Shelby Township, MI (US)

(73) Assignee: Henkel IP & Holding GmbH, Duesseldorf (DE)

( * ) Notice: Subject to any disclaimer, the term of this patent is extended or adjusted under 35 U.S.C. 154(b) by 246 days.

This patent is subject to a terminal disclaimer.

(21) Appl. No.: 13/572,027

(22) Filed: Aug. 10, 2012

(65) Prior Publication Data

US 2013/0062818 A1 Mar. 14, 2013

Related U.S. Application Data

(63) Continuation-in-part of application No. 12/850,768, filed on Aug. 5, 2010, which is a continuation-in-part of application No. 11/814,590, filed as application No. PCT/US2006/004158 on Feb. 7, 2006, now Pat. No. 7,790,094, application No. 13/572,027, which is a continuation-in-part of application No. 12/953,723, filed on Nov. 24, 2010, now abandoned, which is a continuation of application No. PCT/US2009/004996, filed on Jul. 9, 2009.

(60) Provisional application No. 60/650,470, filed on Feb. 7, 2005, provisional application No. 61/079,829, filed on Jul. 11, 2008.

(51) Int. Cl.
| | |
|---|---|
| *B29C 45/00* | (2006.01) |
| *B29C 35/08* | (2006.01) |
| *B29L 31/26* | (2006.01) |
| *B29K 33/00* | (2006.01) |

(52) U.S. Cl.
CPC ....... *B29C 45/0001* (2013.01); *B29L 2031/265* (2013.01); *B29C 35/0888* (2013.01); *B29K 2033/08* (2013.01); *B29C 45/0053* (2013.01); *B29C 2035/0827* (2013.01); *B29C 2035/0833* (2013.01); *B29C 2045/0075* (2013.01)

(58) Field of Classification Search
None
See application file for complete search history.

(56) References Cited

U.S. PATENT DOCUMENTS

| 2,895,950 A | 7/1959 | Krieble |
| 3,425,988 A | 2/1969 | Gorman et al. |

(Continued)

FOREIGN PATENT DOCUMENTS

| DE | 3445715 | 6/1986 |
| EP | 0505737 | 9/1992 |

(Continued)

OTHER PUBLICATIONS

International Search Report issued in connection with International Patent Application No. PCT/US2009/049996 mailed Feb. 26, 2010.

(Continued)

*Primary Examiner* — Monica Huson
(74) *Attorney, Agent, or Firm* — James E. Piotrowski (57) ABSTRACT

The present disclosure relates to liquid injection molding of a curable gasket composition to form mold-in-place gaskets. The curable gasket composition is prepared from at least an actinic radiation curable acrylic component and (meth)acrylate-functionalized silica.

14 Claims, 5 Drawing Sheets

(56) References Cited

U.S. PATENT DOCUMENTS

| | | | |
|---|---|---|---|
| 4,018,851 | A | 4/1977 | Baccei |
| 4,051,195 | A | 9/1977 | McWhorter |
| 4,295,909 | A | 10/1981 | Baccei |
| 5,116,558 | A | 5/1992 | Wrobel et al. |
| 5,332,536 | A | 7/1994 | Boeckeler |
| 3,218,305 | A | 11/1995 | Krieble |
| 5,597,523 | A | 1/1997 | Sakai et al. |
| 5,686,032 | A | 11/1997 | Mizobe et al. |
| 5,885,514 | A | 3/1999 | Tensor |
| 6,387,303 | B1 | 5/2002 | Jones et al. |
| 6,780,897 | B1 | 8/2004 | Blum et al. |
| 7,276,615 | B2 | 10/2007 | Gottschalk-Gaudig et al. |
| 7,517,486 | B2 | 4/2009 | Gottlieb et al. |
| 7,790,094 | B2 * | 9/2010 | Lim et al. ............ 264/478 |
| 2003/0151825 | A1 | 8/2003 | Bielawski et al. |
| 2004/0239008 | A1 | 12/2004 | Gottlieb et al. |
| 2005/0136252 | A1 | 6/2005 | Chisholm et al. |
| 2006/0128853 | A1 | 6/2006 | Olson |
| 2008/0128955 | A1 | 6/2008 | Lim et al. |
| 2009/0025870 | A1 | 1/2009 | Tanaka |
| 2011/0115132 | A1 | 5/2011 | Burdzy et al. |

FOREIGN PATENT DOCUMENTS

| | | |
|---|---|---|
| EP | 1059308 | 10/2006 |
| JP | 2007500633 | 1/2007 |
| WO | 0100393 | 1/2001 |
| WO | 03021138 | 3/2003 |
| WO | 03052011 | 6/2003 |
| WO | 2005090058 | 9/2005 |
| WO | 2006086324 | 8/2006 |

OTHER PUBLICATIONS

Bell: Nelson S. et al. Photophysical Effects between Spirobenzopyran-Methyl methacrylate-Functionalized Colloidal Particles, Langmuir. Published on Web Jan. 14, 2006, vol. 22, No. 4, pp. 1420-1427, ISSN 0007-1641 ISSN 0743-7463.

Parvole: J. et al. Formation of polyacrylate brushes on silica surfaces, Polymer Intenational. 2002, vol. 51, pp. 1111-1116, ISSN 0007-1641.

International Search Report issued in connection with International Patent Application No. PCT/US2006/004158 mailed Jun. 16, 2006.

"Test Method for Vulcanized Rubber and Thermoplastic Elastomer-Determination of Force Decay (Stress Relaxation) in Compression". American Society for Testing Materials. ASTM D6147-97 (2002).

* cited by examiner

INJECTION MOLDING PROCESS AND COMPOSITIONS WITH IMPROVED SEALING CHARACTERISTICS FOR MOLD-IN-PLACE GASKETS

CROSS REFERENCE TO RELATED APPLICATIONS

This application is a continuation-in-part of U.S. patent application Ser. No. 12/850,768, filed Aug. 5, 2010, which is a continuation-in-part of U.S. application Ser. No. 11/814,590, filed Jul. 24, 2007, now U.S. Pat. No. 7,790,094 issued Sep. 7, 2010, the national phase of International Application No. PCT/US2006/004158, filed on Feb. 7, 2006, which claims the benefit of U.S. Provisional Patent Application No. 60/650,470, filed on Feb. 7, 2005 and also is a continuation-in-part of U.S. patent application Ser. No. 12/953,723, filed Nov. 24, 2010, which is a continuation of International Patent Application No. PCT/US2009/004996, filed Jul. 9, 2009, which claims the benefit of U.S. Provisional Patent Application No. 61/079,829, filed Jul. 11, 2008, the contents of each of which are herein incorporated by reference.

The present invention relates to compositions with improved sealing characteristics for mold-in-place gaskets, and a process for forming a mold-in-place gasket by liquid injection molding. More particularly, the present invention relates to a mold-in-place gasket composition incorporating actinic radiation curable acrylic components, (meth)acrylate-functionalized silica, plasticizers, or both, with improved modulus and sealing properties, and a process for forming such mold-in-place gasket.

Cured-in-place gaskets have been formed by liquid injection of a gasket-forming material into a mold. Typical processes include the use of high temperature and/or high pressure liquid injection. For example, a typical process is described in U.S. Pat. No. 5,597,523 to Sakai et al. The molding process and molding device requires use of both an elevated pressure of 24,500 kPa (3,500 psig) and an elevated temperature of 250° C. (480° F.). Upper and lower molds are mated to one to define a mold cavity therebetween. Liquid gasket material, such as epoxy resin or plastic rubber, is pumped into a mold cavity at 2,900 kPa (430 psig). The molds and the gasket material are heated to about 250° C. (480° F.). The gasket material in pumped into the mold cavity. The molds are then clamped together at the elevated pressure of 24,500 kPa (3,500 psig). After the gasket material is cured, the molds and the gasket are cooled to room temperature. The process is described as requiring about one minute to inject and cure the gasket material. The use of such elevated pressures and temperatures at such short cycle times, however, require the use of metallic molds that can withstand such large fluctuations in pressure and temperature while maintaining close tolerances to form the gasket, which make the apparatus and the process expensive and difficult to operate.

U.S. Pat. No. 6,387,303 to Jones et al. describes a molding process and apparatus that avoid the use of elevated temperatures through the use of a gasket-forming material, which is curable at room temperature. The molds and the gasket-forming material is described as being cooled to about 0° C. (32° F.) to avoid polymerization of the room-temperature curable material. The gasket-forming material is described as being a room-temperature curable silicone rubber or an anaerobically curing acrylate compound, which uses temperature cycling to form the gasket.

Thus, there is need for a method for forming gaskets, which does not require the use of high pressures and does not require the cycling of temperatures away from room temperature.

There is also a need for actinic radiation curable compositions useful to form gaskets under such conditions.

SUMMARY

In one aspect, a method for producing a gasket by liquid injection is provided. The method comprises the steps of providing an actinic radiation curable composition with improved compressibility, the composition including a actinic radiation curable acrylic component; (meth)acrylate-functionalized silica; and a photoinitiator; providing an injection mold defining an enclosed gasket-forming cavity and an injection port communicating with the cavity, the mold comprising an actinic radiation transmitting portion for transmitting actinic radiation through the mold assembly; injecting the composition into the mold at temperatures of about 65° C. (150° F.) or less and a pressure of about 1,030 kPa (150 psig) or less to fill the cavity; and transmitting actinic radiation through the actinic radiation transmitting portion in a sufficient amount to cure the composition in the mold to form a gasket in the gasket-forming cavity. The cured gasket can be removed and the process repeated using some or all of the mold.

In another aspect, the actinic radiation transmitting portion may comprise a mold surface which transmits actinic radiation directly therethrough to cure the composition. Desirably, the actinic radiation transmitting portion comprises at least a portion of the mold wall comprised of actinic radiation transmitting plastic or glass.

In still another aspect, the actinic radiation transmitting portion may comprise radiation-conducting channels, which conduct radiation through the mold to the actinic radiation-curing composition. Desirably, the actinic radiation transmitting portion comprises optic fibers.

Desirably, the injection temperature is from about 10° C. (50° F.) to about 66° C. (150° F.). More desirably, the injection temperature is from about 20° C. (68° F.) to about 50° C. (120° F.), including temperatures from about 20° C. (50° F.) to about 25° C. (77° F.). Even more desirably, the injection temperature is at about room temperature.

Desirably, the injection pressure is from about 140 kPa (20 psig) to about 1,030 kPa (150 psig). More desirably, the injection pressure is less than or equal to about 620 kPa (90 psig), for example, from about 345 kPa (50 psig) to about 620 kPa (90 psig).

Desirably, the radiation exposure lasts for about 5 minutes or less, such as 1 minute or less or 30 seconds or less, and desirably is predominantly radiation in the UV and/or visible range of the electromagnetic spectrum.

In one aspect of the invention, there is provided an actinic radiation curable composition with improved compressibility, which includes an actinic radiation curable acrylic component; (meth)acrylate-functionalized silica; and a photoinitiator.

Desirably, the actinic radiation curable composition is extrudable at a rate of about 50 g/minute to about 500 g/minute, such as through a nozzle having a diameter in the range of about 0.8 mm (1/32 of an inch) to about 9.5 mm (3/8 of an inch), such as 3.2 mm (1/8 of an inch), at a pressure in the range of about of about 140 kPa (20 psig) to about 830 kPa (120 psig), such as of about 690 kPa (90 psig) or less.

Desirably, the actinic radiation curable composition has a viscosity of about 100 Pas (10,000 cPs) to about 1,000 Pas (100,000 cPs).

Desirably, the actinic radiation curable composition comprises one or more monofunctional monomers present in a combined amount of about 8% to about 20% by weight of the total composition.

In another aspect, a system for forming a gasket composition at room temperature by low-pressure liquid injection is provided. The system comprises at least first and second mold members having opposed mating surfaces, wherein at least one of the mating surfaces has a cavity in the shape of a gasket, and at least one of the mold members comprises a port in fluid communication with the cavity and wherein at least one of the mold members transmits actinic radiation therethrough; and a source of actinic radiation, the actinic radiation generated therefrom being transmittable to the cavity when the opposed mating surfaces are disposed in substantial abutting relationship. One or both of the mold members can be reusable.

In a further aspect, the second mold member is a part, for example a vehicle powertrain component such as but not limited to a valve cover or oil pan, where the gasket is adhered by mechanical and/or chemical means to a sealing surface of the second mold member. When the first mold member is removed from the assembly, the gasket stays in place on the second mold member to provide a final assembly comprising an integral gasket. A second part replaces the previously molded first part and the molding cycle is repeated using the same first mold member. Such an assembly has an advantage over typical cure-in-place assemblies in that gasket aspect ratios and/or gasket cross sectional shapes can be provided that are not possible with the cure-in-place method. As compared to press-in-place gaskets, the present process eliminates the need to separately form a gasket and subsequently press or otherwise place the gasket on the part in a separate operation.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION

Use of the terms "upper" and "lower" is for the convenience of the reader and is not meant to be limiting with respect to the position of components described by those terms.

In one embodiment a mold 10 is used for forming cured-in-place gaskets. The mold 10 includes an upper mold member 12, a lower mold member 14. Mold 10 can include more than two mold members if desired. The mold members 12, 14 each have a mating surface 13, 15 respectively. One or both mold members define a mold cavity 18 in the mating surface thereof. When mold members 12, 14 are aligned, mold surfaces 13, 15 are in abutting relationship fluidly sealing mold cavity 18 between the mold surfaces 13, 15. An injection port 16 is in fluid communication with the mold cavity 18. The injection port 18 can be defined in either mold member as convenient to mold design and use. Due to the low pressure, i.e., less than about 1,030 kPa (150 psi), and low temperature, i.e., at about 65 C to about room temperature, operation of the present process, the mold 10 avoids the need for mold members having materials suitable for higher pressures and temperatures. Such materials, such as stainless steel, are often more expensive and more difficult to machine or tool into the mold. Desirably, the mold members 12, 14 of the present process may suitably be formed from less expensive materials, such as plastics, glass or aluminum. The plastics may include thermoformed plastics.

As used herein the term "room temperature" and its variants refer ambient temperature typical of industrial settings. Such ambient temperatures are often of a greater range than common usage of the term "room temperature", i.e. from about 20° C. (68° F.) to about 25° C. (77° F.). For example, industrial settings may have ambient temperatures from about 10° C. (50° F.) to about 40° C. (100° F.)

Figure 1:
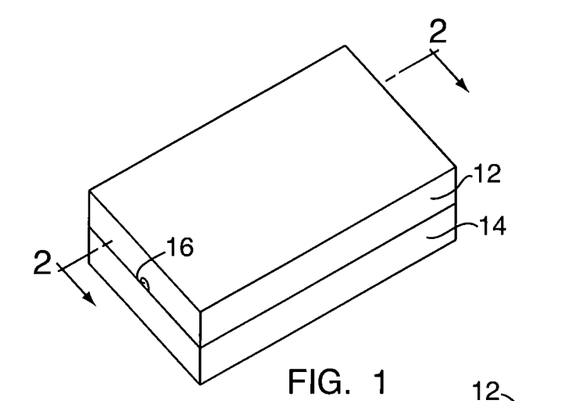
FIG. 1 is a perspective of a mold having a top and a bottom mold member for forming a gasket in accordance with the present disclosure.
Figure 4:
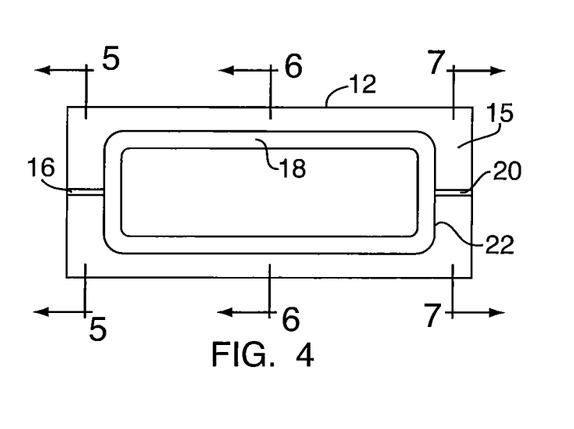
FIG. 4 is a top view of the bottom mold member of FIG. 3 taken along the 4-4 axis.

FIG. 1 is a perspective view of one embodiment of mold 10. The mold 10 includes upper mold member 12, lower mold member 14, and injection port 16, inter-related as shown. As depicted in FIG. 4, the injection port 16 is in fluid communication with the mold cavity 18.

Figure 2:
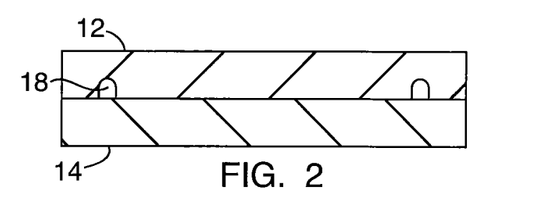
FIG. 2 is a cross-sectional view of the mold of FIG. 1 taken along the 2-2 axis.

FIG. 2 is a cross-sectional view of the mold 10 of FIG. 1 taken along the 2-2 axis. As depicted in FIG. 2, the upper mold member 12 includes a mold cavity 18. Actinic radiation curable composition may be introduced into the mold cavity 18 via the injection port 16.

Figure 3:
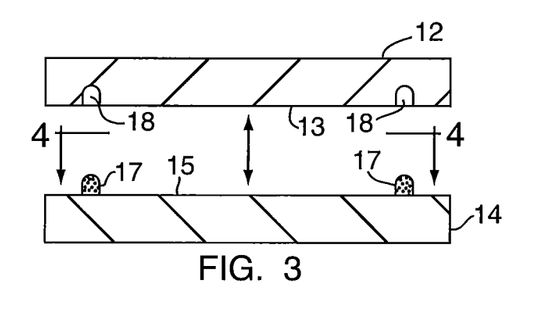
FIG. 3 is an exploded view of the mold of FIG. 2 depicting the top mold member and the bottom mold member.

FIG. 3 is a partial-break-away view of the mold 10 of FIG. 2. Mold member 12 includes a mating surface 13, and mold member 14 includes a mating surface 15. The mold members 12 and 14 may be aligned to one and the other, as depicted in FIG. 2, such that the mating surfaces 13 and 15 are substantially juxtaposed to one and the other. As depicted in FIG. 3 a gasket 17 is removed from the mold cavity 18 and attached to the mating surface 15.

As depicted in FIG. 4, the top view of the mold cavity 18 is in the shape of a closed perimetric design. Although mold cavity 18 is depicted as a rounded rectangle in FIG. 4, the present disclosure is not so limited and other shaped cavities may suitably be used. Further, while the cross-sectional shape of the mold cavity 18 is depicted as being circular or semi-circular in FIG. 2, the present disclosure is not so limited. Because the mold provides support to the uncured gasket composition until curing, complex seal geometries and shapes, for example incorporating high, slender sections or multiple spaced seal lips, can be formed. Such shapes are not possible with conventional cure in place methods that do not support the uncured gasket composition. Moreover, the present disclosure is not limited to having the mold cavity 18 in only the upper mold member 12, and either or both mold members 12, 14 may suitably contain the mold cavity.

As depicted in FIG. 4, the mold 12 may contain a second port 20. The second port 20 is in fluid communication with the mold cavity 18. The second port 20 may be used to degas the cavity 18. As the actinic radiation curable composition is introduced into the cavity 18 via the port 16, air may escape via the second port 20 to degas the mold cavity 20. The size of the second port 20 is not limiting. Desirably, the size, i.e., the cross-section extent, of the second port 20 is minimized to allow for the egress of air, but small enough to limit liquid flow of the actinic radiation curable composition therethrough. In other words, the size of the second port 20 may be pin-hole sized where air can flow through while inhibiting substantial flow of actinic radiation curable composition. Further, the present process is not limited to the use of a single port 16 or a single port 20, and multiple ports may be used for the introduction of the actinic radiation curable composition and/or the venting of air.

It can be useful in some applications to fluidly connect an evacuation device to port 20. The evacuation device can be used to provide a reduced or sub-ambient pressure in cavity 18 to degas the cavity 18 before or during filling with the actinic radiation curable composition. The reduced pressure used is not limited and can be varied to accommodate cavity dimension and configuration, composition and physical properties of the curable composition and injection cycle. Reduced pressures of about 2 inches to about 20 inches of mercury, for example 14 to 18 inches of mercury, have been advantageously used in some applications. In some applications it can be useful to vary the reduced pressure applied to the cavity during the injection and/or cure cycles.

Figure 5:
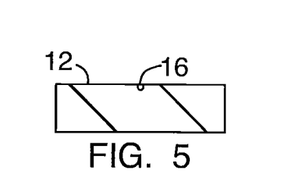
FIG. 5 is a left elevational view of the bottom mold member of FIG. 4 taken along the 5-5 axis.

FIG. 5 is a cross-sectional view of the mold member 12 taken along the 5-5 axis of FIG. 4. As depicted in FIG. 5, the injection port 16 may suitably be a cavity or bore in the mold member 12. The portion of the injection port 16 may be threaded (not shown) or have a valve (not shown) or a tubing or a hose (not shown) through which the actinic radiation curable composition may be delivered.

Figure 6:
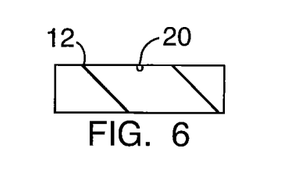
FIG. 6 is a right elevational view of the bottom mold member of FIG. 4 taken along the 6-6 axis.

FIG. 6 is a cross-sectional view of the mold member 12 taken along the 6-6 axis of FIG. 4. As depicted in FIG. 6, the port 20 may suitably be a cavity or bore in the mold member 12. The portion of the port 20 may have a valve (not shown) for controlling the egress of air and/or actinic radiation curable composition.

Figure 7:
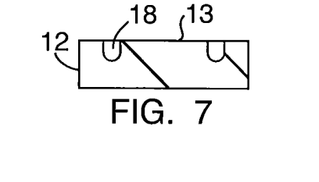
FIG. 7 a cross-sectional view of the bottom mold member of FIG. 4 taken along the 7-7 axis.

FIG. 7 is a cross-sectional view of the mold member 12 taken along the 7-7 axis of FIG. 4. The mold cavity 18 is depicted as extending into the mold member 12 at its mating surface 13.

Figure 8:
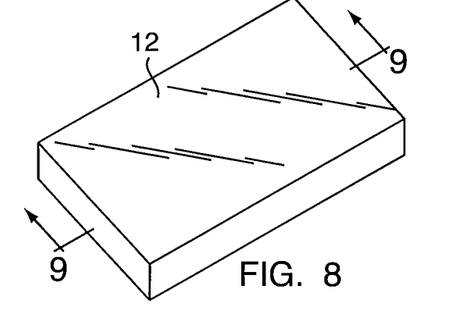
FIG. 8 is a perspective view of the top mold member of FIG. 1 depicting the top mold member having transparent material.
Figure 9:
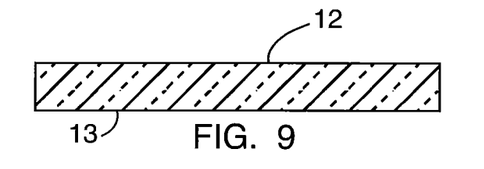
FIG. 9 is a cross-sectional view of the transparent top mold member of FIG. 8 taken along the 9-9 axis.

FIG. 8 is a perspective view of the mold member 12 depicting that the mold member 12 may be made of or may comprise an actinic radiation transparent material. As used herein an actinic radiation transparent material is a material that is transparent or transmissible or substantially transmissible to actinic radiation such that actinic radiation from a source will move through the material in sufficient amount to cure an actinic radiation curable composition on an opposing side of the material in a commercially reasonable time such as, for example, 5 minutes or less or desirably 1 minute or less or advantageously 30 seconds or less. Examples of actinic radiation transparent materials include some glasses and some polymers such as cured silicone rubber. A cross-sectional view of one embodiment of a transparent mold member 12 is depicted in FIG. 9. As used herein actinic radiation is radiation that can produce chemical reactions. Actinic radiation includes ultraviolet light, visible light, and combinations thereof. Desirably, the actinic radiation used to cure the actinic radiation curable composition has a wavelength from about 200 nm to about 1,000 nm. Useful ultraviolet light (UV) includes, but is not limited to, UVA (about 320 nm to about 410 nm), UVB (about 290 nm to about 320 nm), UVC (about 220 nm to about 290 nm) and combinations thereof. Useful visible light includes, but is not limited to, blue light, green light, and combinations thereof. Such useful visible lights have a wavelength from about 450 nm to about 550 nm.

In another aspect of the present, one of the mold members is itself an article of manufacture or a part of an article of manufacture, such as an portion of a vehicle, for example a valve cover. The actinic radiation curable composition may be formed directly on such an article of manufacture or a part thereof by the methods of the present disclosure. Thus, upon curing the composition and removing the mold member, the article or part is produced with an integral gasket, which eliminates the need for mechanically and/or chemically attaching a separately formed gasket.

Figure 15:
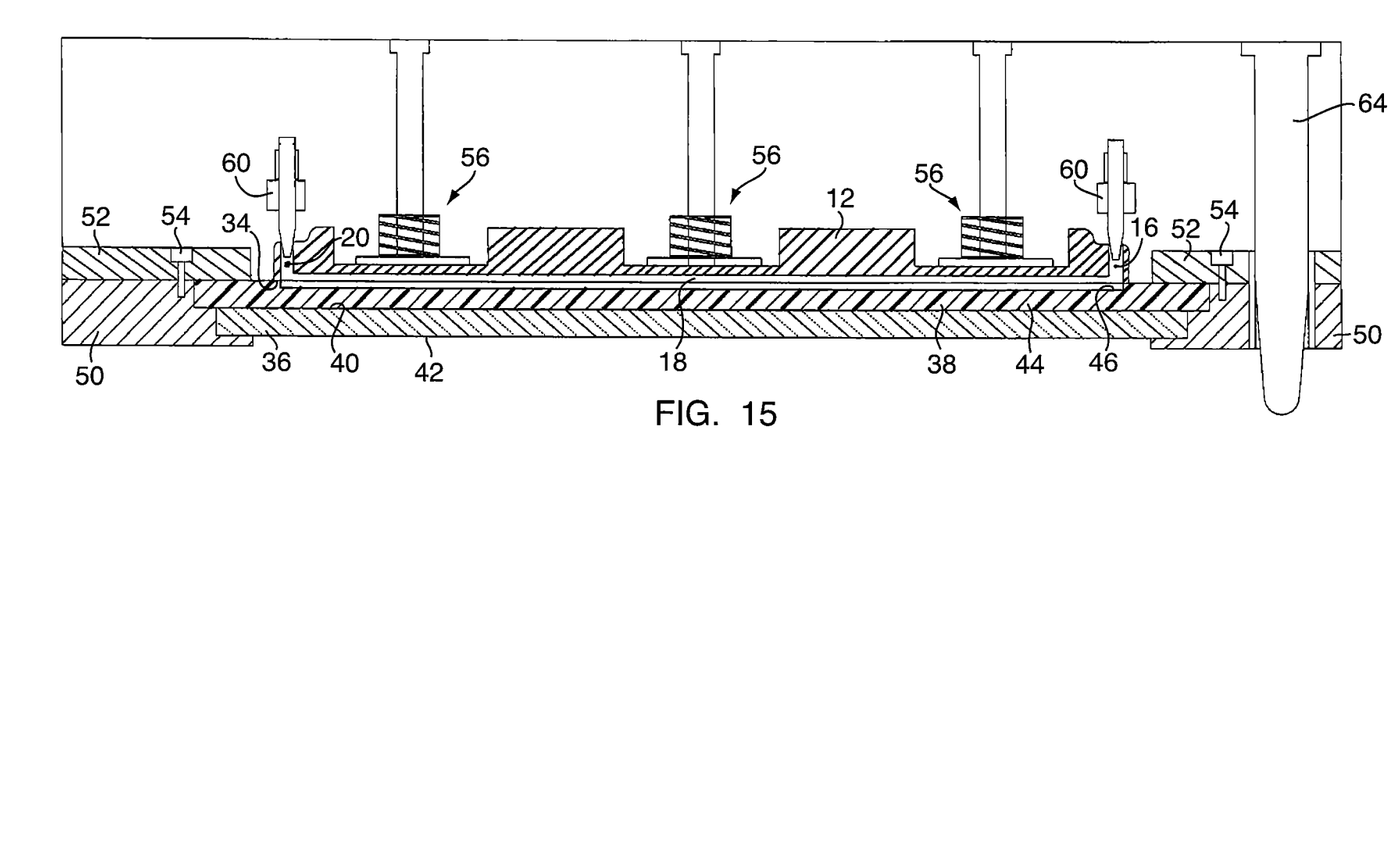
FIG. 15 is a schematic, partially cross-sectional view of one embodiment of a mold assembly of the present disclosure.
Figure 17:
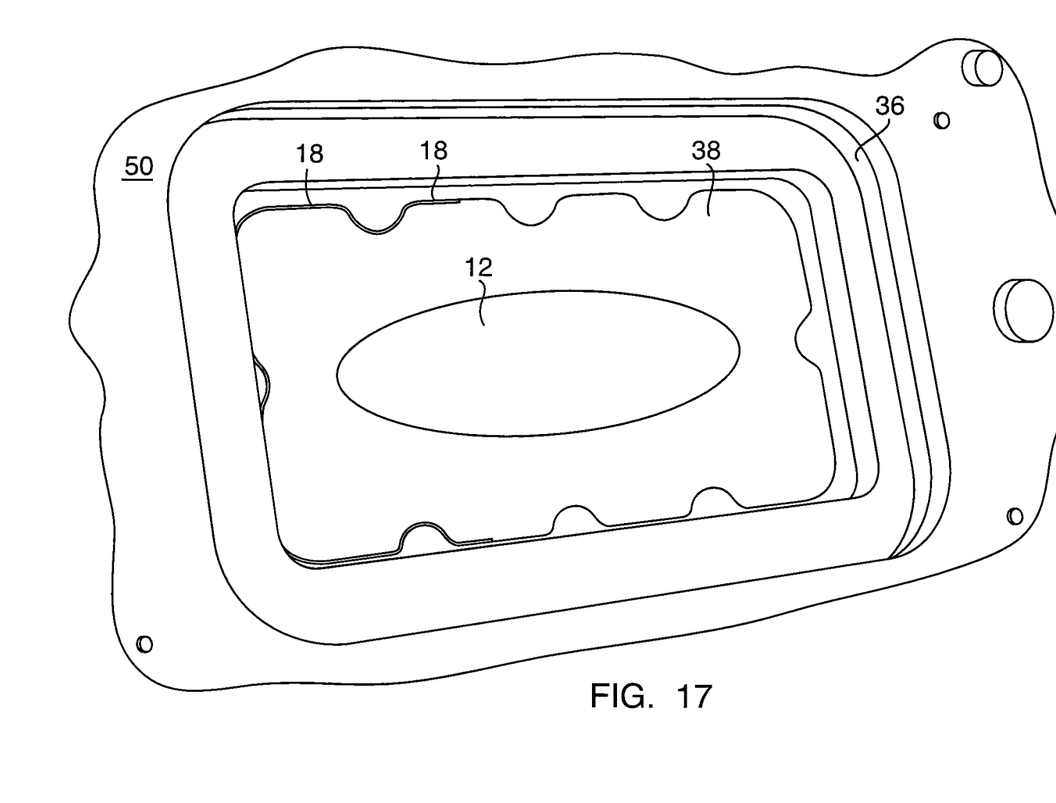
FIG. 17 is a schematic view of the mold of FIG. 15 through the frame and lower mold member.

FIG. 15 is a cross sectional view of one embodiment of a mold 10 comprising mold member 12 and mold member 14. Mold member 12 is an article of manufacture or part thereof having a predefined sealing surface 34 to which a gasket will be molded. Mold member 14 comprises a base 36 and an overlying polymeric liner 38. Both the base 36 and liner 38 are transparent, i.e., substantially transmissible, to actinic radiation, for example ultraviolet (UV) radiation. The base 36 can be generally rectangular with spaced, planar major surfaces 40, 42 defining a thickness selected to provide support for the liner 38 during the molding process. The base 36 typically will not include cavity 18. The base 36 can be, for example, glass. The liner 38 will have a generally planar support surface 44 adjacent one base major surface 40 and an opposing molding surface 46 defining cavity 18. The liner 38 can be, for example, cured silicone rubber. The base 36 and liner 38 are supported by a peripheral frame 50. The interior portion of the frame 50 is open to allow transmission of actinic radiation through the base 36 and liner 38 to the uncured composition in the cavity 18. FIG. 17 schematically illustrates a view through the open interior portion one embodiment of a frame 50 to mold member 14, cavity 18 and mold member 12 (shown in the oval opening of liner 38) during injection of curable composition into the cavity 18. The darker colored portion of cavity 18 is filled with curable composition while the lighter colored portion of cavity 18 has not yet been filled. With reference to FIG. 15, a retainer 52 is secured to the frame 50, for example by mechanical fasteners 54 over the liner 38 to hold the base 36 and liner 38 in place. The frame 50 and retainer 52 can be made from, for example, metal, composites or plastic. The actinic radiation opaque article of manufacture 12 is placed adjacent liner 38 with the part sealing surface 34 in contact with the liner molding surface 46. Contact of sealing surfaces 34, 46 encloses cavity 18. Liner cavity 18 can be aligned with a corresponding cavity in the article sealing surface if desired. Mold member 12 is removably secured to mold member 14, for example by clamps 56, so that sealing surfaces 34, 46 remain sealingly engaged to maintain a fluidly sealed cavity 18 during the molding process. The article 12 has one or more ports 16, 20 fluidly connected to the cavity 18. Actinic radiation curable composition can be supplied from a container through lines 58 to a nozzle 60. The nozzle 60 is selectively fluidly engageable to port 16 or 20 to allow controlled injection of composition through port 16 or 20 into cavity 18. A separate nozzle can be used to control degassing through port 20.

Figure 10:
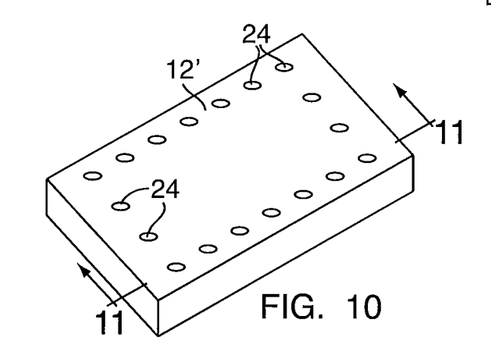
FIG. 10 is a perspective view of the top mold member of FIG. 1 having light transmissible conduits therethrough.
Figure 11:
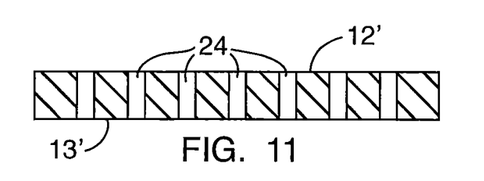
FIG. 11 is a cross-sectional view of the top mold member of FIG. 10 taken along the 11-11 axis depicting the conduits traversing through the top mold member.
Figure 12:
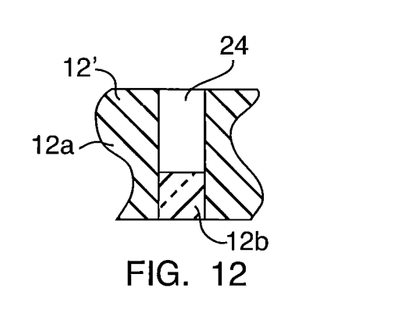
FIG. 12 is a partial side elevational view of another aspect of the top mold member of FIG. 11 depicting a light transmissible conduit terminating at a transparent portion of the top mold member.
Figure 13:
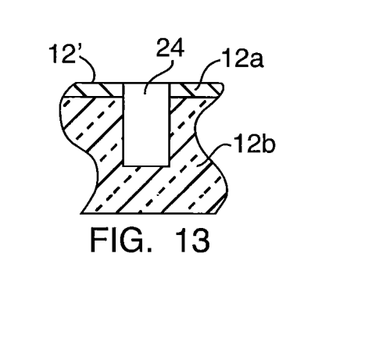
FIG. 13 is a partial side elevational view of another aspect of the top mold member of FIG. 11 depicting a light transmissible conduit disposed within a transparent portion of the top mold member.

FIG. 10 is a perspective view of mold member 12' depicting one or more holes or conduits 24 therethrough. As depicted in FIG. 11 which is a cross-section view of the mold member 12', the conduits 24 may extend completely through the mold member 12'. As depicted in FIGS. 10 and 11, the mold member 12' need not be made of transparent material as the conduits 24 may allow the transmission of the curing UV light or curing actinic radiation (not shown). The present process, however, is not so limiting. For example as depicted in FIG. 12, the conduit 24 need not extend entirely through the mold member 12'. The conduit 24 may extend only partially through the mold member 12'. Desirably, the portion 12b of the mold member 12' below the conduit 24 is made of transparent material to permit the transmission of actinic radiation therethrough. As depicted in FIG. 12, the remaining portion 12a of the mold member 12' need not be made of a transparent material. Further, the present process is not limited to partially extending conduits 24 having transparent material 12b proximally located just at the terminus of the conduit 24. For example, as depicted in FIG. 12, significant portions of the mold member 12' may comprise transparent material 12b. Desirably, a top portion 15 of, the mold member 12' comprises non-transparent material 12a.

Figure 14:
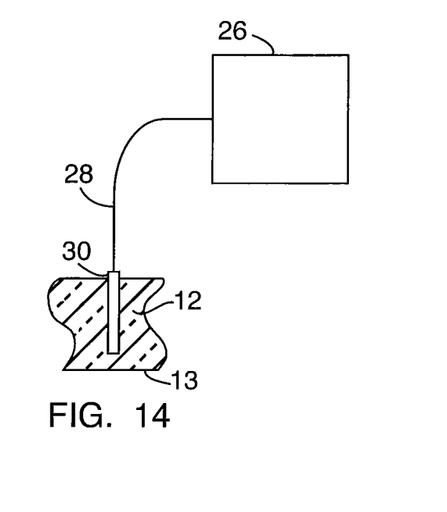
FIG. 14 is a schematic illustration of a light source in communication with the top mold member of the present disclosure.

Actinic radiation passes through one or both molds to initiate cure of uncured actinic radiation curable composition in the cavity 18 from one or both sides. One system for delivering actinic radiation is schematically depicted in FIG. 14. A light source 26 generates actinic radiation, such radiation in the visible and/or UV range of the electromagnetic spectrum. The actinic radiation passes through fiber optic cable 28. The cable 28 may be positionable within the mold member 12, 12'. The cable 28 may further include a light guide 30 for releasably securing the light source or cable 28 with the mold member 12.

In one aspect at least one of the two mold members 12, 14 is an actinic radiation transmissible member and the actinic radiation is transmitted through the transmissible member. The amount of actinic radiation transmitted through the transmissible member and onto said actinic radiation curable composition may be detected and monitored. The amount of actinic radiation transmitted onto the composition may be increased when the actinic radiation level declines to a preset minimum. The mating surface of the transmissible member may be simply cleaned when the radiation level declines to the preset minimum to increase actinic radiation transmittance therethrough. Alternatively, the amount of actinic radiation may be controlled by providing the mating surface of the transmissible member with a first removable liner; removing the first removable liner when the radiation level declines to the preset minimum; and providing a second removable liner at the mating surface of the transmissible member to increase actinic radiation transmittance therethrough.

Figure 16:
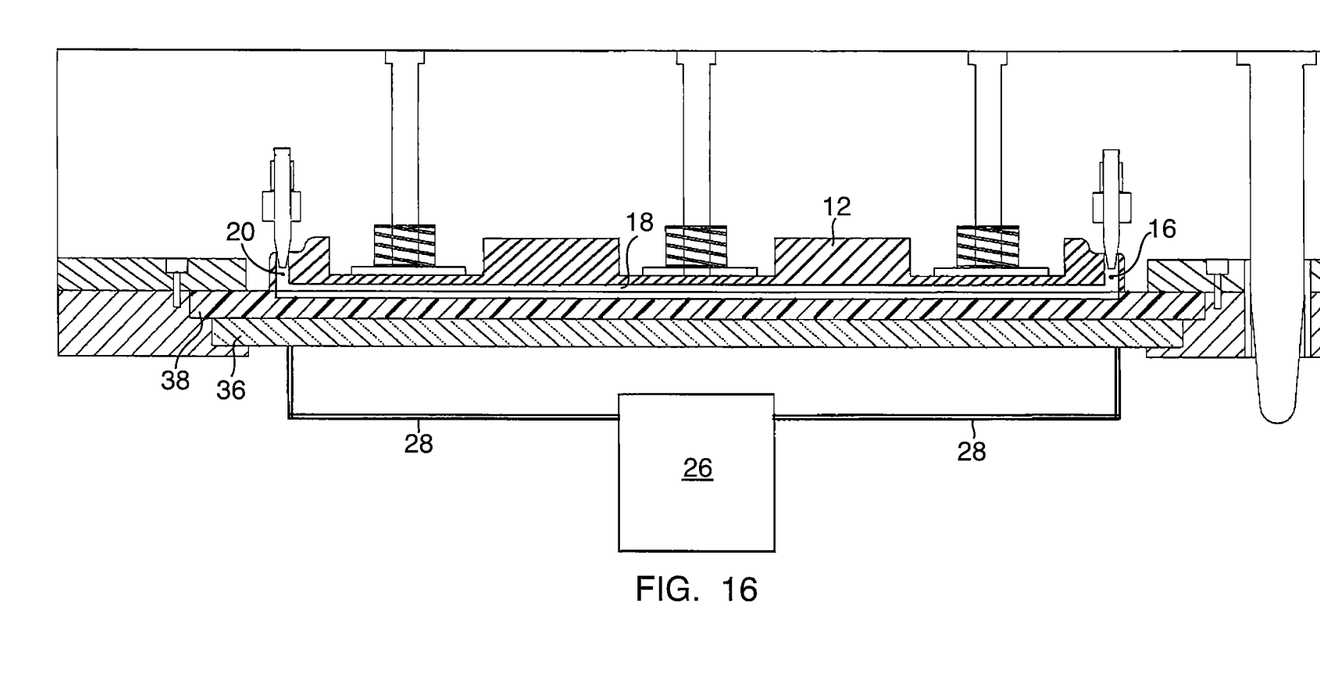
FIG. 16 is schematic, partially cross-sectional view of one embodiment of a mold assembly including spot curing.

In another system for delivering actinic radiation shown in FIG. 16 a light source 26 generates actinic radiation. The actinic radiation passes through fiber optic cables 28 and is focused in selected areas to spot cure actinic radiation curable composition in the selected area before curing composition in the cavity 18. Curable composition away from the fiber optic cables 28 will not receive sufficient actinic radiation to cure.

One embodiment of a method for producing a gasket by liquid injection molding includes the steps of providing an actinic radiation curable composition; providing an injection mold 10 defining an enclosed gasket-forming cavity 18 and an injection port 16 fluidly communicating with the cavity 18, the mold 10 comprising actinic radiation transmitting portion for permitting actinic radiation transmission therethrough; injecting the composition in the mold at temperatures of about 65° C. (150° F.) or less and a pressure of about 1,030 kPa (150 psig) or less to fill the cavity 18; and transmitting a curable amount of actinic radiation through the radiation transmitting portion of the mold 10 to cure the composition into a gasket.

The mold 10 may include at least two members 12, 14, with the two members 12, 14 having opposed mating surfaces 13, 15. As the composition is pumped or otherwise pressurized into the mold cavity 18, the composition may exhibit a higher temperature, i.e., about 50° C. (120° F.) or less, than ambient temperature due to frictional considerations. Temperatures used in this method are below the thermal polymerization temperature of the composition and are not sufficient to cure the composition.

Prior to the injecting of the composition the mating surfaces 13, 15 of the mold members 12, 14, respectively, are aligned to define the mold cavity 18. After aligning the mold members 12, 14 may be secured to one and the other prior to the step of injecting the actinic radiation curable composition.

The method of this aspect may further include the step of degassing the cavity prior to injecting or while injecting the liquid, actinic radiation curable composition. Desirably, the step of degassing includes degassing through the second port 20, which is in fluid communication with the cavity 18. An evacuation device such as a vacuum source or vacuum pump may be fluidly connected to the cavity 18 to provide a reduced or sub-ambient pressure therein.

The actinic radiation curable composition fully fills the cavity 18 without the need for excessive liquid handling pressures, i.e., pressures substantially above 1,030 kPa (150 psig).

Desirably, the composition fully fills the cavity 18 at a fluid handling pressure of about 690 kPa (100 psig) or less.

After the actinic radiation curable composition is cured or at least partially cured, the mold members 12, 14 may be released from one and the other to expose the gasket, after which the gasket may be removed from the mold cavity 18.

One embodiment of a method for producing a gasket by liquid injection molding includes the steps of providing a mold member 14 comprising a generally planar base 36 and a polymeric liner 38 supported by the base and defining a cavity 18 in a molding surface 46; providing a mold member 12 comprising an article of manufacture having a predefined sealing surface 34 and an injection port 16; securing the article sealing surface 34 to the liner molding surface 46 so that the injection port 16 is fluidly connected to the now sealed cavity 18; injecting an actinic radiation curable composition through the injection port 16 to fill the cavity 18; and transmitting a curable amount of actinic radiation through the base 36 and liner 38 to cure the composition in sealed cavity 18 into a gasket that is bonded to the article sealing surface 34.

One embodiment of a method for producing a gasket by liquid injection molding includes the steps of providing mold members 12, 14, wherein one or both of the mold members define a cavity 18 and a plurality of ports 16, 20; securing mold members 12, 14 together so that the injection port 16 and second port 20 are each fluidly connected to the cavity 18; injecting a small amount of actinic radiation curable composition through the second port 20 wherein the amount is not sufficient to fill the cavity 18; and subsequently injecting an amount of actinic radiation curable composition through the injection port 16, wherein the amount is sufficient to fill the cavity 18; and transmitting a sufficient amount of actinic radiation to cure the composition enclosed in cavity 18 into a gasket. The amount of composition remaining in cavity 18 after injection through port 20 should be sufficient to fill only about 1% to about 50%, for example about 2% to about 10% of the cavity volume adjacent to port 20 and can be about 3 to about 10 grams depending on dimensions of cavity 18. This can be done by injecting only this amount or injecting excess material through port 20 and subsequently removing some of the injected composition during degassing. In some conditions it has been found that when the composition is forced through port 16 into cavity 18 an air bubble is left in the cavity 18 adjacent port 20. After curing the air bubble undesirably forms a void in the finished gasket. Pre-injecting a small amount of composition through port 20 and into cavity 18 lessens the possibility of air bubble formation at this location.

One embodiment of a method for producing a gasket by liquid injection molding includes the steps of providing mold members 12, 14, wherein one or both of the mold members define a cavity 18 and a plurality of ports 16, 20; securing mold members 12, 14 together so that the injection port 16 and second port 20 are each fluidly connected to the cavity 18; injecting an actinic radiation curable composition through the injection port 16 to fill the cavity 18; transmitting an amount of actinic radiation through one or both mold members 12, 14 in the area of the injection port 16 and/or second port 20, wherein the amount of transmitted radiation is sufficient to at least partially cure the composition in the port area but not cure all of the composition in the cavity 18; and subsequently transmitting an amount of actinic radiation through one or both mold members 12, 14 sufficient to substantially cure the composition into a gasket. In one embodiment shown best in FIG. 16 transmission of actinic energy to selected areas of the cavity 18 can be accomplished by using fiber optic cables 28 to focus actinic radiation from a source 26 to the selected portions of the mold 14. Actinic radiation from the fiber optic cable 28 can pass through mold 14 (comprising base 36 and liner 38 in this embodiment) to curable composition in selected portions of the cavity 18. In some applications an injector nozzle is used to inject composition under low pressure through injection port 16. When the injector is removed a small amount of composition may flow back through injection port 16 and on to the exterior surface of mold member 12. This composition is not fully cured and can be objectionable. Curing the composition in the port area forms a semi-solid or solid "plug" that allows the injection nozzle to be removed but blocks composition from moving through the port after injection nozzle removal. Subsequent curing of actinic radiation curable composition in the entire cavity 18 forms the finished gasket.

In other embodiments combinations of method features can be used to provide desired results. For example, mold member 12 can be an article of manufacture and mold member 14 can comprise a base 36 and polymer liner 38 as previously described. Actinic radiation curable composition can be injected through port 16 or through port 16 with a small amount through port 20. The composition can be spot cured in the area of port 16 and/or port 20 before removal of the injector nozzles. Composition in the remainder of cavity 18 is subsequently cured by exposure to actinic radiation transmitted through mold member 14.

Desirably, the actinic radiation curable composition has an extrusion rate of about 50 g/min to about 500 g/min through a 3.2 mm (0.125 inch) nozzle at a pressure of about 620 kPa (90 psig). More desirably, the actinic radiation curable composition has an extrusion rate of about 100 g/min to about 200 g/min through a 3.2 mm (0.125 inch) nozzle at a pressure of about 620 kPa (90 psig).

The extrusion rate may be determined by industry standard techniques. For example, a testing apparatus may include a sealant gun (Semco® model 250 or equivalent), a cartridge (Semco® model 250-C6 or 250-C8 or equivalent), and a nozzle with a 3.2 mm (0.125 inch) orifice (Semco® 440 or equivalent). Such devices and assemblies thereof are commercially available from Semco Application Systems, Glendale, Calif. After placing the test composition in the cartridge, pressure within the cartridge is controlled at 620 kPa (90 psi). The extrusion rate is then determined by weighing the amount of material passed through the nozzle at 620 kPa (90 psi) after 15 seconds.

Compositions with higher extrusion rates are more difficult to process at the low injection pressure of about 1,030 kPa (150 psig) or less. Composition with lower extrusion rates may not adequately fill the cavity and properly form a gasket therein. Desirably, the actinic radiation curable composition has a viscosity from about 0.01 Pas (10 centipoise or cPs) to about 1,000 Pas (1,000,000 cPs) at 25° C. (77° F.). In some applications the actinic radiation curable composition desirably has a viscosity from about 100 Pas (10,000 cPs) to about 2,000 Pas (200,000 cPs). More desirably for the liquid injection molding process disclosed herein the actinic radiation curable composition has a viscosity from about 100 Pas (10,000 cPs) to about 1,000 Pas (100,000 cPs).

Desirably, the actinic radiation curable composition is cured at or about room temperature within about 5 minutes or less. More desirably, the actinic radiation curable composition is cured within 1 minute or less, for example, cured within 30 seconds or less.

The actinic radiation curable composition may be a one-part liquid composition, which may optionally include a volume expansion agent so as to produce a foamed gasket.

The actinic radiation curable composition includes one or more actinic radiation curable acrylic components. As used herein an actinic radiation curable acrylic component includes monomers, oligomers or polymers having reactive (meth)acrylate and/or (meth)acryloyl moieties. (Meth)acrylate includes both acrylate and methacrylate. (Meth)acryloyl includes both acryloyl and methacryloyl. In some preferred embodiments the actinic radiation curable acrylic component does not include silicon atoms.

Useful actinic radiation curable acrylic components include (meth)acrylate monomers. Such monomers are desirably characterized as being either flexible or rigid. It will be apparent to one of ordinary skill in the art that the choice of monomers is dependent on the desired properties of the resultant sealant product. Within the (meth)acrylate monomer are a wide variety of materials represented by $H_2C=CGCO_2R$, where G may be hydrogen, halogen or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

Useful (meth)acrylate monomers include polyethylene glycol di(meth)acrylates, desirably triethyleneglycol di(meth)acrylate, hydroxypropyl (meth)acrylate, bisphenol-A di(meth)acrylates, such as ethoxylated bisphenol-A (meth)acrylate ("EBIPA" or "EBIPMA"), and tetrahydrofuran (meth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA").

The actinic radiation curable acrylic component can be a urethane-acrylate monomer such as a polyurethane polyacrylate monomer. Examples of such monomers are described in U.S. Pat. No. 3,425,988 to Gorman et al., specifically incorporated by reference herein. These monomers may be represented by the following general formula:

where B may be a polyvalent organic radical selected from the group consisting of alkyl, alkenyl, cycloalkyl, aryl, aralkyl, alkaryl and heterocyclic radicals both substituted and unsubstituted; X may be selected from the group consisting of —O— and radicals; n may be an integer from 2 to 6 inclusive; $R^1$ may be a member selected from the class consisting of hydrogen, chlorine and methyl and ethyl radicals; and $R^2$ may be a divalent organic radical selected from the group consisting of lower alkylene of 1 to 8 carbon atoms, phenylene and naphthalene radicals.

The actinic radiation curable acrylic component can be a urethane-acrylate-capped poly(alkylene) ether polyol monomer, such as those described in U.S. Pat. No. 4,018,851 to Baccei, specifically incorporated by reference herein. The actinic radiation curable acrylic component can be a urethane-acrylate-capped polybutadiene-based monomer, such as those described in U.S. Pat. No. 4,295,909, to Baccei, specifically incorporated by reference herein.

The actinic radiation curable acrylic component can be an alkylene glycol diacrylate having the general formula:

where $R^6$ represents a radical selected from hydrogen, lower alkyl of 1-4 carbon atoms, inclusive, hydroxyalkyl of 1-4 carbon atoms inclusive, and where $R^4$ may be a radical selected from hydrogen, halogen, and lower alkyl of 1-4 carbon atoms; $R^5$ may be a radical selected from hydrogen or —OH and where m may be an integer equal to at least 1, desirably 1-8 and more desirably from 1 to 4; n may be an integer equal to at least 1, desirably 1 to 20; and p may be 0 or 1.

The actinic radiation curable acrylic component can be a mono-, di-, tri- tetra- and polyethylene glycol dimethacrylate or the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

The actinic radiation curable acrylic component can be ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopentyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and combinations thereof. Other useful actinic radiation curable acrylic components include those acrylates derived from bisphenol-A, such as bisphenol-A dimethacrylate, hydrogenated bisphenol-A dimethacrylate, and ethoxylated bisphenol-A di(meth)acrylate.

The actinic radiation curable acrylic component can include 1,3-butylene glycol diacrylate, diethylene glycol diacrylate, 1,6-hexanediol diacrylate, neopentylglycol diacrylate, polyethylene glycol diacrylate, tetraethylene glycol diacrylate, methylene glycol diacrylate, pentaerythritol tetraacrylate, tripropylene glycol diacrylate, ethoxylated bisphenol-A-diacrylate, trimethylolpropane triacrylate, di-trimethylolopropane tetraacrylate, dipenterythritol pentaacrylate, pentaerythritol triacrylate and the corresponding methacrylate compounds. Advantageous actinic radiation curable acrylic components include an acrylate terminated telechelic polyacrylate. Other useful actinic radiation curable acrylic components are reaction products of (meth)acrylic acid and epoxide resins, urethane resins and poly(meth) acrylic ester compounds are also described in U.S. Pat. Nos. 4,051,195, 2,895,950, 3,218,305, and 3,425,988, the contents of each of which are incorporated by reference herein.

The actinic radiation curable acrylic component can be a monofunctional acrylate ester (ester containing one acrylate group) also may be used. When dealing with monofunctional acrylate esters, it may be desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. These materials are often incorporated as reactive diluents which are capable of copolymerizing with the various other polymerizable materials.

The actinic radiation curable acrylic component can be a functional acrylic oligomer or polymer. For convenience, both will be referred to as functional acrylic polymer. Advantageously, the functionality is (meth)acrylic or (meth)acryloyl. Desirably, these materials include at least two (meth) acryloyl groups. Desirably, the (meth)acryloyl group is represented by —OC(O)C($R^1$)=$CH_2$, where $R^1$ is hydrogen or methyl. More desirably, the functional acrylic polymer is a (meth)acryloyl-terminated polyacrylate. The functional acrylic polymer can have a molecular weight from about 1,000 to about 100,000, more desirably from about 5,000 to about 40,000. The functional acrylic polymer can have a viscosity of about 2,000 Pas (200,000 cPs) to about 8,000 Pas (800,000 cPs) at 25° C. (77° F.), more desirably from about 4,500 Pas (450,000 cPs) to about 5,000 Pas (500,000 cPs) at room temperature. The functional acrylic polymer can have a specific gravity of from about 1.0 to about 1.30. Details of some desirable functional acrylic polymers may be found in European Patent Application No. EP 1 059 308 A1 to Nakagawa et al., the contents of which are incorporated by reference herein. Useful functional acrylic polymers are available from Kaneka Corporation, Japan, such as under the designations RC220C, RC210C, RC200C, RC100C, XX013C and XX039C. It is believed that the RC220C, RC210C, RC200C and XX013C are each terpolymers of combinations of substituted and unsubstituted alkylacrylates, such as ethyl acrylate, 2-methoxyethyl acrylate and n-butyl acrylate (varying by molecular weight), whereas the RC100C is a homopolymer of n-butyl acrylate.

In some embodiments the actinic radiation curable acrylic component comprises actinic radiation curable acrylic monomers and actinic radiation curable acrylic oligomers and/or polymers.

Desirably, the actinic radiation curable acrylic component can be present in an amount of from about 30 percent to about 85 percent by weight of the composition, and desirably from about 40 to about 70 percent by weight of the composition.

The actinic radiation curable composition includes a (meth)acrylate-functionalized silica. As used herein (meth) acrylate-functionalized silica is silica that has been (meth) acrylate functionalized separately from other composition components. As used herein (meth)acrylate-functionalized silica can also be referred to as "active fumed silica" and also as "functional fumed silica". It has been found that the use of active fumed silica improves the physical characteristics of the gasket once formed. These improvements are more fully demonstrated in the Examples below. The (meth)acrylate-functionalized silica is chemically active and desirably functions as a crosslinker with the actinic radiation curable acrylic component. The (meth)acrylate-functionalized silica can be a methacrylsilane treated silica. Useful (meth)acrylate-functionalized silicas include 2-propenoic acid, 2-methyl, 3-(trimethoxysilyl) propylester, reaction products with silica. Suitable (meth)acrylate-functionalized silicas are commercially available from, for example, Evonik Industries, and sold under the trade name Aerosil. Such active fumed silicas include those available under the trade designation R7200, which is a structure modified and methacrylsilane aftertreated fumed silica having a high specific surface area ("BET") of 150 $m^2$/g. Wacker Chemie has also offered for sale commercially an active fumed silica under the trade designation HDK H30RY, which has a BET of 200 $m^2$/g.

Desirably, the (meth)acrylate-functionalized silica may be present in an amount of from about 5 percent to about 30 percent by weight of the composition, and desirably may be present in an amount of about 10 percent to about 20 percent by weight.

Other fillers, including non-(meth)acrylate functionalized fumed silica fillers, herein referred to as "conventional fumed silica" and also as "traditional fumed silica", may additionally be included in the gasket-forming composition. Such fumed silicas may be treated with materials such as hexamethyldisilazane, trimethoxyoctylsilane and polydimethylsiloxane, which provides additional hydrophobicity but little to no crosslinking functionality with the actinic radiation curable acrylic component. For example, traditional hydrophobic fumed silica may be used, such as those commercially available from Evonik Industries and sold under the trade name Aerosil, from Cabot Corporation and sold under the tradename CABOSIL or from Wacker and sold under the tradename HDK-2000.

Other fillers can be present in an amount from about 0.1 percent to about 30 percent, more desirably from 0.5 percent to about 20 percent and most desirably from about 2 percent to about 5 percent by weight.

In an advantageous embodiment the actinic radiation curable composition includes a combination of both (meth)acrylate-functionalized silica and non-active fumed silica. Desirably, non-active or traditional fumed silica may be present in an amount less than (meth)acrylate-functionalized silica, but any ratio of (meth)acrylate-functionalized silica to non-active fumed silica may be used. The ratio of (meth)acrylate-functionalized silica to non-active fumed silica is from 3:1 to 1:3, though desirably it is about 2:1.

The actinic radiation curable composition can optionally include a plasticizer. It has been found that the use of plasticizers in the disclosed actinic radiation curable composition improves the physical characteristics of the formed gasket. Plasticizers have been found to not only increase the elongation of the cured composition, but further have the effect of depressing the glass transition temperature (Tg) of the cured composition. Having a lower Tg results in the product having a higher amount of sealing force at lower temperatures. With the inclusion of the plasticizer, the product has a sufficient sealing force at temperatures as low as about −20° C. to about −50° C. The improved characteristics are more fully demonstrated in the Examples set forth below.

Suitable plasticizers include those plasticizers commonly known in the art, including but not limited to monomeric and dimeric plasticizers. One desirable plasticizer is di(butoxyethoxyethoxyethyl) glutarate, which is commercially available from HallStar and sold under the trade name Plasthall DBEEEG. Another plasticizer is one commercially available from HallStar sold under trade name TegMer 809. Other traditional plasticizers are suitable for the gasket-forming compositions described herein.

When used, the plasticizer may be present in an amount of from about 5 percent to about 20 percent by weight of the composition, such as about 10 percent to about 15 percent by weight.

Desirably, the actinic radiation curable composition includes a photoinitiator. Photoinitiators enhance the rapidity of the curing process when the photocurable compositions as a whole are exposed to actinic radiation.

Desirably, the photoinitiator may be a non-peroxide photoinitiator, and most desirably may be a blend of propanone and phosphine oxide, however other photoinitiators may suitably be used. A photoinitiator may be added to the composition in an amount effective to respond to the actinic radiation and to initiate and induce curing of the associated components, via substantial polymerization thereof.

Suitable photoinitiators useful with ultraviolet (UV) actinic radiation curing mono- and polyolefinic monomers include free radical generating UV initiators such as substituted benzophenones and substituted acetophenones, benzoin and its alkyl esters and xanthone and substituted xanthones. Preferred photoinitiators include diethoxy-acetophenone, benzoin methyl ether, benzoin ethyl ether, benzoin isopropyl ether, diethoxyxanthone, chloro-thio-xanthone, azo-bisisobutyronitrile, N-methyl diethanol-amine-benzophenone and mixtures thereof. Particular examples of suitable photoinitiators for use herein include, but are not limited to, photoinitiators available commercially from Ciba Specialty Chemicals, under the "IRGACURE" and "DAROCUR" trade names, specifically IRGACURE 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), 819 [bis(2,4,6-trimethyl benzoyl) phenyl phosphine oxide], 2022 [IRGACURE 819 dissolved in DAROCUR 1173 (described below)] and DAROCUR 1173 (2-hydroxy-2-methyl-1-phenyl-1-propan-1-one) and 4265 (the combination of 2,4,6-trimethylbenzoyl-diphenyl-phosphine oxide and 2-hydroxy-2-methyl-1-phenyl-propan-1-one); and the visible light [blue] photoinitiators, dl-camphorquinone and IRGACURE 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., IRGACURE 651), and 2-hydroxy-2-methyl-1-phenyl-1-propane (e.g., DAROCUR 1173), bis(2,4,6-trimethyl benzoyl) phenyl phosphine oxide (e.g., IRGACURE 819 and IRGACURE 2022), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., IRGACURE 1700), as well as the visible photoinitiator bis($\eta^5$-2,4-cyclopentadien-1-yl)-bis[2,6-difluoro-3-(1H-pyrrol-1-yl)phenyl]titanium (e.g., IRGACURE 784DC).

The photoinitiator may be desirably present in an amount of from about 0.5 percent to about 5 percent by weight of the composition, such as about 1 percent to about 2 percent by weight.

The actinic radiation curable composition can optionally include a reactive diluent. Reactive diluents include a monofunctional (meth)acrylate. Useful monofunctional (meth) acrylates may be embraced by the general structure $CH_2=C(R)COOR^2$ where R is H, $CH_3$, $C_2H_5$ or halogen, such as Cl, and $R^2$ is $C_{1-8}$ mono- or bicycloalkyl, a 3 to 8-membered heterocyclic radial with a maximum of two oxygen atoms in the heterocycle, H, alkyl, hydroxyalkyl or aminoalkyl where the alkyl portion is $C_{1-8}$ straight or branched carbon atom chain. Among the specific monofunctional (meth)acrylate monomers particularly desirable, and which correspond to certain of the structures above, are hydroxypropyl (meth) acrylate, 2-hydroxyethyl (meth)acrylate, methyl (meth)acrylate, tetrahydrofurfuryl (meth)acrylate, cyclohexyl (meth) acrylate, 2-aminopropyl (meth)acrylate, isobornyl (meth) acrylate, isodecyl (meth)acrylate, and 2-ethyl hexyl (meth) acrylate.

Reactive diluents include N,N-dimethyl acrylamide ("DMAA") acrylic acid, and β-carboxyethyl acrylate (such as is available commercially from Rhodia under the tradename SIPOMER) are usefully employed in the practice of the present invention.

Commercially available representative examples of some useful reactive diluents include those used in the samples below. More specifically, SARTOMER SR395 (isodecyl acrylate, commercially available from Sartomer Company, Inc., Exton, Pa.), SARTOMER SR495 (caprolactone acrylate, commercially available from Sartomer), SARTOMER SR531 (cyclic trimethylolpropane formal acrylate, commercially available from Sartomer), and SARTOMER PRO6622 (3,3,5 trimethylcyclohexyl acrylate, commercially available from Sartomer) are each appropriate choices, either alone or in combination with each other or with the other noted reactive diluents.

When present, the reactive diluent may be desirably used in the range of 0.5 to about 50 percent by weight, such as about 5 to about 30 percent by weight, and desirably in the range of from about 10 percent to about 20 percent by weight.

The actinic radiation curable composition can optionally include a toughening agent. Some useful toughening agents are exemplified in the samples below. Other toughening agents include VAMAC DP (an ethylene acrylic dipolymer elastomer available commercially from DuPont), HYCAR VTBN (methacrylate-functional acrylonitrile-butadiene-co-polymers commercially available from Hanse Chemie), HYPALON 20 (commercially available from DuPont, and reported to be greater than 96% chlorosulfonated polyethylene, less than 0.4% carbon tetrachloride, less than 0.04% chloroform and less than 2% talc), NEOPRENE AD-10 (commercially available from DuPont, and reported to be greater than 98% 2chloro-1,3-butadiene polymers and copolymers, less than 1% water and less than 1% talc), NIPOL IR2200L (commercially available from Zeon, and reported to be greater than 99% polyisoprene polymer), RICACRYL 3100 (commercially available from Sartomer and reported to be a methacrylated polybutadiene low-functional UV-curable resin), and combinations thereof.

When used, the toughening agent should be used in the range of about 0.5 to about 30 percent by weight, such as about 2.5 to about 10 percent by weight.

The actinic radiation curable composition can optionally include an antioxidant. Some useful antioxidants include phenolic and/or phosphite antioxidants, including those available commercially from Ciba Specialty Chemicals under the tradename IRGANOX. Other conventional antioxidants are suitable in the present gasket-forming compositions.

When present, the antioxidants may be desirably used in an amount of from about 0.1 percent to about 5 percent, such as about 0.3 to about 1 percent by weight.

The actinic radiation curable composition can optionally include a mold release agent. Some useful mold release agents include those available commercially for instance from Crompton Corporation under the tradename MOLD-PRO 678 (a powdered stearic acid).

Optionally, or alternatively, a mold release agent may be applied to the mold cavity prior to the introduction of the liquid gasket-forming composition. The release agent, if needed, helps in the easy removal of the cured gasket from the mold cavity. Useful mold release compositions include, but are not limited, to dry sprays such as polytetrafluoroethylene, and spray-on-oils or wipe-on-oils such as silicone or organic oils. Useful mold release compositions include, but are not limited, to compositions including $C_6$ to $C_{14}$ perfluoroalkyl compounds terminally substituted on at least one end with an organic hydrophilic group, such as betaine, hydroxyl, carboxyl, ammonium salt groups and combinations thereof, which is chemically and/or physically reactive with a metal surface. A variety of mold releases are available, such as those marketed under Henkel's FREKOTE brand. Additionally, the release agent may be a thermoplastic film, which can be formed in the mold shape.

The actinic radiation curable composition can optionally include from about 0% by weight to about 20% by weight rheology modifier; from about 0% by weight to about 20% by weight adhesion promoter; and/or from about 0% by weight to about 20% by weight fluorescent agents or pigments.

An exemplary actinic radiation curable composition is shown below.

| component | range (wt %) | preferred range (wt %) |
|---|---|---|
| actinic radiation curable acrylic component | 30-85 | 40-70 |
| (meth)acrylate functional silica | 5-30 | 10-20 |
| non (meth)acrylate functional filler | 0.1-30 | 2-5 |
| ratio (meth)acrylate functional silica to non (meth)acrylate functional filler | | 3:1-1:3 |
| plasticizer | 0-20 | 10-15 |
| photoinitiator | 0.5-5 | 1-2 |
| reactive diluent | 0-50 | 10-20 |
| toughening agent | 0-30 | 2.5-10 |
| mold release agent | 0-5 | 0.25-0.5 |
| antioxidant | 0-5 | 0.3-1 |

Advantageously, the actinic radiation curable composition has a viscosity appropriate to permit injection at an injection pressure of about 1,030 kPa (150 psig) or less.

A cured gasket formed of reaction products of the actinic radiation cured composition has an improved modulus and level of elongation, while maintaining a desirable compressibility. It has been found that the combination of active fumed silica and non-active fumed silica as described herein provides adequate strength while maintaining a desired compression set. Desirably, the cured gasket has a tensile modulus at 100% elongation of from about 200 psi to about 600 psi, and more specifically from about 300 psi to about 500 psi. Desirably, the cured gasket has an improved initial sealing force (measured with a Dyneon CSR fixture at 25% compression), desirably from about 60 N to about 150 N. While the physical characteristics of tensile modulus and initial sealing force are improved, the cured gasket of the present invention desirably maintains a low compression set. Desirably, the cured gasket has a compression set (70 hours @ 150° C.) in the range of 25% to 60%, and more desirably from about 5% to about 25%. Desirably the cured gasket has a Durometer, Shore A in the range of 50 to 85+/−5. Desirably, the cured gasket has a tensile strength in the range of about 300 psi to about 1200 psi or more and desirably about 350 psi to about 1000 psi. Desirably, the cured gasket has an elongation in the range of about 150% to about 300%. Desirably, the cured gasket has a glass transition temperature between about −20° C. and about −50° C.

EXAMPLES

The examples set forth below provide various samples in which different components are evaluated. The examples are included for purposes of illustration so that the disclosure may be more readily understood and are in no way intended to limit the scope of the disclosure unless otherwise specifically indicated.

Example 1—Higher Levels of Active Fumed Silica

In Table 1 below, two samples have been formulated. Composition A is a formulation that includes a higher level of active fumed silica and a lower level of traditional fumed silica, while Composition B includes a lower amount of active fumed silica and a higher level of traditional fumed silica. The compositions were formed and mold-injected.

TABLE 1

Composition Formulations

| | Sample/Amt. (wt %) | |
|---|---|---|
| Component | A | B |
| actinic radiation curable acrylic component (1) | 53 | 53 |
| Antioxidants (2) | 1.0 | 1.0 |
| Dimethylacrylamide | 17.5 | 17.5 |
| Plasticizer (3) | 10.0 | 10.0 |

TABLE 1-continued

Composition Formulations

| Component | Sample/Amt. (wt %) | |
|---|---|---|
| | A | B |
| Active fumed silica (4) | 12.75 | 4.25 |
| Traditional fumed silica (5) | 4.25 | 12.75 |
| Photoinitiator (6) | 1.0 | 1.0 |

(1) RC220C and XX013C supplied by Kaneka Corporation
(2) Irganox B-215 available from Ciba
(3) Plasthall DBEEEG available from the HallStar Company
(4) Aerosil R7200 available from Evonik Industries
(5) HDK-H2000 available from Wacker Chemical Corporation
(6) Irgacure 2022 available from Ciba Table 2 below shows the results of various tests performed on the gaskets made by Composition A and Composition B, respectively. As can be seen in Table 2, the formulation with higher levels of the active fumed silica compared to traditional fumed silica (Composition A) has a higher tensile modulus, a higher sealing force under compression, and better compression set at 150 C than the formulation with lower levels of active fumed silica compared to traditional fumed silica (Composition B).

TABLE 2

Test Results

| Physical Properties | Sample | |
|---|---|---|
| | A | B |
| Tensile Modulus at 100% elongation | 422 psi | 246 psi |
| Initial sealing force - Dyneon CSR fixture 25% compression | 82N | 60N |
| Compression set 1000 Hr @150C | 52% | 65% |

Example 2—Compositions Including a Plasticizer

In Table 3 below, two samples have been formulated. Composition C is a formulation that includes a plasticizer, while Composition D does not include a plasticizer. The compositions were formed and mold-injected.

TABLE 3

| Component | Sample/Amt. (wt %) | |
|---|---|---|
| | C | D |
| actinic radiation curable acrylic component (1) | 53.5 | 69.5 |
| Antioxidants (2) | 1.0 | 1.0 |
| Dimethylacrylamide | 17.5 | 15 |
| Plasticizer (3) | 10.0 | — |
| Active fumed silica (4) | 8.5 | 13.5 |
| Fumed silica (5) | 8.5 | — |
| Photoinitiator (6) | 1.0 | 1.0 |

(1) RC220C available from Kaneka Corporation
(2) Irganox B-215 available from Ciba
(3) Plasthall DBEEEG available from HallStar Company
(4) Aerosil R7200 available from Evonik Industries
(5) HDK-H2000 available from Wacker Chemical Corporation
(6) Irgacure 2022 available from Ciba The formed gaskets were then tested for respective glass transition temperature levels. The results are set forth in Table 4 below.

TABLE 4

Results of Glass Transition Temperature Test

| Physical Property | Sample | |
|---|---|---|
| | C | D |
| Glass Transition Temperature | −26° C. | −11° C. |

As can be seen, the composition including the plasticizer (Composition C) has a much lower glass transition temperature than the composition without a plasticizer (Composition D). Composition C has an improved glass transition temperature, which shows an increase in the amount of sealing force that a cured product can retain at extremely low temperatures.

Example 3—Comparative Compositions

Tables 5 and 6 below compare eight different compositions (E-L), encompassing varying amounts of plasticizers and silicas. Compositions E-L were formed and exposed to actinic radiation to test their various properties.

TABLE 5

Comparative Compositions (E-H)

| Component | Sample/Amt. (wt %) | | | |
|---|---|---|---|---|
| | E | F | G | H |
| actinic radiation curable acrylic component (1) | 33.125 | 28.875 | 26.75 | 26.75 |
| actinic radiation curable acrylic component (2) | 33.125 | 28.875 | 26.75 | 26.75 |
| Antioxidants (3) | 1 | 1 | 1 | 1 |
| Dimethyl acrylamide | 17.5 | 17.5 | 17.5 | 17.5 |
| Plasticizer (4) | 10 | 10 | 10 | 10 |
| Active fumed silica (5) | — | — | — | 4.25 |
| Fumed silica (6) | 4.25 | 12.75 | 17 | 12.75 |
| Photoinitiator (7) | 1 | 1 | 1 | 1 |

(1) RC220C available from Kaneka Corporation
(2) XX013C supplied by Kaneka Corporation
(3) Irganox B-215 available from Ciba
(4) Plasthall DBEEEG available from the HallStar Company
(5) Aerosil R7200 available from Evonik Industries
(6) HDK-H2000 available from Wacker Chemical Corporation
(7) Irgacure 2022 available from Ciba

TABLE 6

Comparative Compositions (I-L)

| Component | Sample/Amt. (wt %) | | | |
|---|---|---|---|---|
| | I | J | K | L |
| actinic radiation curable acrylic component (1) | 26.75 | 33.125 | 28.875 | 26.75 |
| actinic radiation curable acrylic component (2) | 26.75 | 33.125 | 28.875 | 26.75 |
| Antioxidants (3) | 1 | 1 | 1 | 1 |
| Dimethyl acrylamide | 17.5 | 17.5 | 17.5 | 17.5 |
| Plasticizer (4) | 10 | 10 | 10 | 10 |
| Active fumed silica (5) | 12.75 | 4.25 | 12.75 | 17 |

TABLE 6-continued

Comparative Compositions (I-L)

| Component | Sample/Amt. (wt %) | | | |
|---|---|---|---|---|
| | I | J | K | L |
| Fumed silica (6) | 4.25 | — | — | — |
| Photoinitiator (7) | 1 | 1 | 1 | 1 |

(1) RC220C available from Kaneka Corporation
(2) XX013C supplied by Kaneka Corporation
(3) Irganox B-215 available from Ciba
(4) Plasthall DBEEEG available from the HallStar Company
(5) Aerosil R7200 available from Evonik Industries
(6) HDK-H2000 available from Wacker Chemical Corporation
(7) Irgacure 2022 available from Ciba Cured samples of eight actinic radiation curable compositions were tested for various properties, including durability, tensile strength, modulus, and various compression set tests. The results are summarized in Table 7 below.

TABLE 7

Properties of Comparative Tests

| Physical Properties | Sample | | | | | | | |
|---|---|---|---|---|---|---|---|---|
| | E | F | G | H | I | J | K | L |
| Durometer (Shore A) | 38 | 46 | 52 | 58 | 62 | 40 | 53 | 60 |
| Tensile (PSI) | 347 | 590 | 738 | 608 | 620 | 350 | 592 | 693 |
| Modulus (100%) (PSI) | 115 | 158 | 212 | 246 | 422 | 131 | 385 | 536 |
| Elongation (% @ break) | 300 | 356 | 364 | 258 | 176 | 235 | 182 | 158 |
| Initial CSR @ 150° C. (N) | 30 | 41 | 48 | 62 | 80 | 33 | 67 | 101 |
| % Retained @ 24 hrs @ 150° C. | 61 | 47 | 46 | 44 | 42 | 68 | 60 | 52 |
| % Retained @ 70 hrs @ 150° C. | 60 | 44 | 46 | 37 | 36 | 61 | 58 | 51 |
| Net force aft 24 hrs @ 150° C. (N) | 18.3 | 19.3 | 22.1 | 27.3 | 33.6 | 22.4 | 40.2 | 52.5 |
| Net force aft 70 hrs @ 150° C. (N) | 18.0 | 18.0 | 22.0 | 22.9 | 28.8 | 20.1 | 38.9 | 51.4 |
| Initial compression set after 70 hrs at 150° C. (w/ initial comp of 25%) | 15 | 75 | 24 | 31 | 25 | −4 | 6 | 13 |
| Initial compression set after 70 hrs at 150° C. (w/ initial comp of 35%) | 16 | 28 | 27 | NA | NA | −4 | 5 | 12 |
| Initial compression set after 70 hrs at 150° C. (w/ initial comp of 45%) | F | 23 | 29 | NA | NA | F | F | F |

As can be seen, the compositions incorporating at least a portion of active fumed silica generally performed better than those compositions lacking any amount of active fumed silica. In particular, those compositions incorporating higher amounts of active fumed silica (Samples I, K, and L), each displayed a combination of shore durometer values, modulus at 100%, initial sealing force at 150° C., and net sealing force retained at both 24 hours and 70 hours desirable for use in a gasket application. Further, the compositions including at least a portion of active fumed silica showed superior compression set (at 25% and 35%) properties than those lacking any active fumed silica. "F" indicates failure of the cured sample.

Example 4

In Table 8 below, five actinic radiation curable compositions have been formulated. Compositions M and O contain a combination of two actinic radiation curable acrylic components of different molecular weights, Composition O contains an additional antioxidant and Composition M contains active fumed silica whereas Composition O contains traditional fumed silica. The compositions were formed and mold-injected.

TABLE 8

Composition Formulations

| Component | Sample/Amt. (wt %) | | | | |
|---|---|---|---|---|---|
| | M | N | O | P | Q |
| actinic radiation curable acrylic component (1a) | 18.8 | — | 18.5 | — | — |
| actinic radiation curable acrylic component (1b) | 37.7 | — | 37.0 | — | — |
| actinic radiation curable acrylic component (1c) | — | 55.5 | — | 55.5 | 58.5 |
| Antioxidant (2a) | 1.0 | 1.0 | 1.0 | 1.0 | 1.0 |
| Antioxidant (2b) | — | 1.0 | 1.0 | 1.0 | 1.0 |
| Dimethylacrylamide | 17.5 | 17.5 | 17.5 | 17.5 | 17.5 |
| Isobornyl Acrylate | 5.0 | 5.0 | 5.0 | 5.0 | 5.0 |
| Plasticizer (3) | 5.0 | 5.0 | 5.0 | 5.0 | 5.0 |
| Active fumed silica (4) | 14 | 14 | — | — | — |
| Active fumed silica (5) | — | — | 14 | 14 | 11 |
| Photoinitiator (6) | 1.0 | 1.0 | 1.0 | 1.0 | 1.0 |

(1a) RC100C available from Kaneka Corporation
(1b) XX019C supplied by Kaneka Corporation
(1c) XX039C supplied by Kaneka Corporation (higher molecular weight than XX019C)
(2a) Irganox B-215 available from Ciba
(2b) Vulkanox ZMB-2/C5 (zinc-4- and 5-methyl-2-mercaptobenzimidazole) available from LANXESS
(3) TegMer 809 (PEG 400 Di-2-ethylhexoate) available from the HallStar Company
(4) Aerosil R7200 available from Evonik Industries
(5) HDK-H30RY available from Wacker Chemical Corporation
(6) Irgacure 2022 available from Ciba Cured samples of the five actinic radiation curable compositions were tested for various properties, including durability, tensile strength, modulus, and various compression set tests. The results are summarized in Table 9 below.

TABLE 9

| Physical Properties | Sample | | | | |
|---|---|---|---|---|---|
| | M | N | O | P | Q |
| Durometer (Shore A) | 56 | 55 | 69 | 68 | 61 |
| Tensile (PSI) | 638 | 759 | 1109 | 1256 | 1063 |
| Modulus (100%) (PSI) | 327 | 366 | 527 | 492 | 351 |

TABLE 9-continued

| Physical Properties | Sample | | | | |
|---|---|---|---|---|---|
| | M | N | O | P | Q |
| Elongation (% @ break) | 207 | 233 | 222 | 278 | 293 |
| Initial CSR @ 150° C. (N) | 62 | 76 | 104 | 125 | 77 |
| % Retained at 24 hrs at 150° C. | 57 | 44 | 44 | 42 | 46 |
| % Retained at 70 hrs at 150° C. | 56 | 40 | 42 | 36 | 41 |
| Net force aft 24 hrs @ 150° C. (N) | 35.3 | 33.4 | 45.8 | 52.5 | 35.4 |
| Net force aft 70 hrs @ 150° C. (N) | 34.7 | 30.4 | 43.7 | 45 | 31.6 |
| Initial compression set aft 70 hrs @ 150° C. (w/initial comp of 25%) | 9 | 12 | 19 | 18 | 13 |
| Initial compression set aft 70 hrs @ 150° C. (w/initial comp of 35%) | 10 | 12 | 14 | 18 | 11 |
| Initial compression set aft 70 hrs @ 150° C. (w/initial comp of 45%) | 7 | 9 | 13 | 14 | 10 |

As can be seen, Composition O, P and Q (containing the active fumed silica HDK-H30RY) demonstrate an even greater improvement tensile, modulus, elongation and sealing force than Compositions M and N (containing the active fumed silica R7200).

What is claimed is:

1. A method for producing a gasket comprising:
   providing an actinic radiation curable composition with improved tensile modulus, said composition comprising an actinic radiation curable acrylic component; (meth)acrylate-functionalized silica; and a photoinitiator;
   providing an injection mold assembly defining a gasket-forming cavity and an injection port communicating with the cavity, the mold assembly comprising an actinic radiation transmissible portion for permitting actinic radiation transmission therethrough;
   injecting the composition into the cavity at a pressure of about 1,030 kPa (150 psig) or less to fill the cavity;
   transmitting actinic radiation through the radiation transmissible portion in a sufficient amount cure the composition in the mold assembly to form a gasket.

2. The method of claim 1, wherein the curable composition further comprises a hydrophobic fumed silica.

3. The method of claim 1, wherein the curable composition further comprises a hydrophobic fumed silica and the ratio of (meth)acrylate-functionalized silica to hydrophobic fumed silica is between 3:1 to 1:3.

4. The method of claim 1, wherein the curable composition has a glass transition temperature of between about −20° C. to about −50° C.

5. The method of claim 1, wherein said step of injecting the curable composition into the mold cavity is performed at approximately room temperature.

6. The method of claim 1, wherein the curable composition includes at least one monofunctional monomer present in a combined amount of about 5% to about 25% by weight of the total composition.

7. The method of claim 1, wherein the mold assembly comprises an article of manufacture and the curable composition is cured-in-place on the article of manufacture to provide an integral gasket thereon eliminating the need to separately form a gasket and subsequently place the gasket on the article of manufacture.

8. A method for producing a gasket comprising:
   providing an actinic radiation curable composition prepared from at least about 30% to 90% actinic radiation curable acrylic component, from about 5% to about 30% of (meth)acrylate functionalized silica, from about 1% to about 90% non-(meth)acrylate functionalized fumed silica, from about 0.5% to about 50% reactive diluent, and from about 0.01% to about 5% photoinitiator, wherein the percentages are based on weight percent of the total composition;
   providing an injection mold assembly defining a gasket-forming cavity, an injection port fluidly communicating with the cavity, and an actinic radiation transmitting portion for transmitting actinic radiation through the mold assembly to the gasket-forming cavity;
   injecting the composition into the gasket-forming cavity;
   transmitting actinic radiation through the radiation transmitting portion in a sufficient amount cure the composition in the gasket-forming cavity to form a gasket.

9. The method of claim 8 wherein the step of injecting at a pressure of about 1,030 kPa (150 psig) or less.

10. A method for producing an integral gasket bonded to an article of manufacture, comprising:
    providing a first, actinic radiation opaque article of manufacture having a gasket surface;
    providing a mold member having a surface, an injection port, an actinic radiation transmitting portion for transmitting actinic radiation transmission through the mold member, and a polymer liner abuttingly disposed on the mold surface;
    contacting the article of manufacture and the mold member to form a gasket-forming cavity adjacent to the gasket surface, the gasket-forming cavity fluidly connected to the injection port;
    injecting an actinic radiation curable composition prepared from at least an actinic radiation curable acrylic component; (meth)acrylate-functionalized silica; and a photoinitiator through the injection port and into the gasket-forming cavity;
    transmitting actinic radiation through the radiation transmitting portion in a sufficient amount to cure the composition in the gasket-forming cavity to form a gasket integrally bonded to the gasket surface of the article of manufacture.

11. The method of claim 10, further comprising removing the second mold member from contact with the first mold member wherein the cured gasket remains bonded to the article gasket surface.

12. The method of claim 10, further comprising removing the second mold member from contact with the first mold member;
    providing a second, actinic radiation opaque article of manufacture having a gasket surface;
    contacting the second article of manufacture and the mold member to form a gasket-forming cavity adjacent to the gasket surface, the gasket-forming cavity fluidly connected to the injection port;
    injecting the actinic radiation curable composition through the injection port and into the gasket-forming cavity;
    transmitting actinic radiation through the radiation transmitting portion in a sufficient amount to cure the composition in the gasket-forming cavity to form a gasket integrally bonded to the gasket surface of the second article of manufacture.

13. The method of claim 10, wherein the article of manufacture comprises a portion of a vehicle.

14. The method of claim 10, wherein the article of manufacture comprises a power train component.

* * * * *